United States Patent
Nagara

(10) Patent No.: US 12,119,177 B2
(45) Date of Patent: Oct. 15, 2024

(54) CAPACITOR WITH SEAT PLATE

(71) Applicant: Panasonic Intellectual Property Management Co., Ltd., Osaka (JP)

(72) Inventor: Hisao Nagara, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 193 days.

(21) Appl. No.: 17/649,799

(22) Filed: Feb. 3, 2022

(65) Prior Publication Data

US 2022/0157521 A1 May 19, 2022

Related U.S. Application Data

(63) Continuation of application No. PCT/JP2020/032204, filed on Aug. 26, 2020.

(30) Foreign Application Priority Data

Aug. 30, 2019 (JP) ................. 2019-158329

(51) Int. Cl.
*H01G 2/02* (2006.01)
*H01G 9/00* (2006.01)
(Continued)

(52) U.S. Cl.
CPC ............. *H01G 2/02* (2013.01); *H01G 9/0003* (2013.01); *H01G 9/10* (2013.01); *H01G 9/145* (2013.01); *H01G 9/15* (2013.01)

(58) Field of Classification Search
CPC ........ H01G 9/10; H01G 9/012; H01G 9/0003; H01G 2/02
See application file for complete search history.

(56) References Cited

U.S. PATENT DOCUMENTS

| 7,532,484 B1* | 5/2009 | Sailor | H05K 3/325 |
| | | | 361/773 |
| 2001/0048583 A1* | 12/2001 | Nakada | H01G 9/008 |
| | | | 361/509 |

(Continued)

FOREIGN PATENT DOCUMENTS

| JP | 63-159817 U | 10/1988 |
| JP | 2006-287100 A | 10/2006 |

(Continued)

OTHER PUBLICATIONS

International Search Report of PCT application No. PCT/JP2020/032204 dated Nov. 17, 2020.

(Continued)

*Primary Examiner* — David M Sinclair
(74) *Attorney, Agent, or Firm* — Rimon P.C.

(57) ABSTRACT

A capacitor with a seat plate includes a capacitor main body and a seat plate that holds the capacitor main body. The capacitor main body includes a capacitor element, a case having an opening for housing the capacitor element, a sealing member that closes the opening of the case, and a plurality of lead terminals each penetrating the sealing member and the seat plate. The seat plate includes a heat dissipation member, and has a first surface and a second surface opposite to the first surface. The heat dissipation member is exposed at the first surface and the second surface. The capacitor element is disposed at a side close to the second surface of the seat plate. The case is in contact with a region of the heat dissipation member. The region of the heat dissipation member is exposed at the second surface.

9 Claims, 8 Drawing Sheets

(51) Int. Cl.
  *H01G 9/10*   (2006.01)
  *H01G 9/145*  (2006.01)
  *H01G 9/15*   (2006.01)

(56) References Cited

U.S. PATENT DOCUMENTS

2003/0123217 A1* 7/2003 Nakamura ............. H01G 9/008
                                                  361/520
2017/0053745 A1* 2/2017 Aoyama ................ H01G 9/035
2018/0240605 A1* 8/2018 Nakashima ........... H01G 9/008
2022/0262564 A1* 8/2022 Bueno De Camargo Mello .........
                                                  H01G 2/06

FOREIGN PATENT DOCUMENTS

| | | | |
|---|---|---|---|
| JP | 2006310610 A | * | 11/2006 |
| JP | 2007-287777 | | 11/2007 |
| JP | 2008-130774 | | 6/2008 |
| JP | 2008244033 A | * | 10/2008 |
| JP | 2010-205995 | | 9/2010 |
| JP | 2016-076600 | | 5/2016 |

OTHER PUBLICATIONS

English Translation of Chinese Office Action dated Jun. 6, 2024 for the related Chinese Patent Application No. 202080059814.6.

* cited by examiner

CAPACITOR WITH SEAT PLATE

BACKGROUND

1. Technical Field

The present disclosure relates to a capacitor with a seat plate, and particularly relates to improvement of heat dissipation.

2. Description of the Related Art

The capacitor is usually mounted on a substrate or the like via a seat plate. The lead terminal of the capacitor is inserted into a through hole provided in the seat plate, and then bent along the mounting surface of the seat plate on the substrate. The lead terminal disposed on the mounting surface is used for soldering with the substrate.

Unexamined Japanese Patent Publication No. 2008-130774 and Unexamined Japanese Patent Publication No. 2016-076600 propose that a seat plate includes a wall that supports a side surface of a capacitor. This can provide a wider area for supporting the capacitor, and improves vibration resistance.

SUMMARY

A capacitor with a seat plate according to a first aspect of the present disclosure includes a capacitor main body and a seat plate that holds the capacitor main body. The capacitor main body includes a capacitor element, a case having an opening for housing the capacitor element, a sealing member that closes the opening of the case, and a plurality of lead terminals each penetrating the sealing member and the seat plate. The seat plate includes a heat dissipation member, and has a first surface and a second surface opposite to the first surface. The heat dissipation member is exposed at the first surface and the second surface. The capacitor element is disposed at a side close to the second surface of the seat plate. The case is in contact with a region of the heat dissipation member. The region of the heat dissipation member is exposed at the second surface.

A capacitor with a seat plate according to a second aspect of the present disclosure includes a capacitor main body and a seat plate that holds the capacitor main body. The capacitor main body includes a capacitor element, a case having an opening for housing the capacitor element, a sealing member that closes the opening of the case, and a plurality of lead terminals each penetrating the sealing member and the seat plate. The seat plate includes a heat dissipation member. And the seat plate includes a base part and a support wall that extends from the base part along a peripheral surface of the case. The base part has a first surface and a second surface opposite to the first surface. The capacitor element is disposed at a side close to the second surface of the seat plate. A part of the heat dissipation member is disposed in the support wall, and the heat dissipation member is exposed at the first surface of the base part.

According to the present disclosure, heat generated inside the capacitor with a seat plate is easily dissipated to the outside, and thus the life of the capacitor can be extended and the ripple current can be set high.

DETAILED DESCRIPTIONS OF EMBODIMENT

Figure 1:
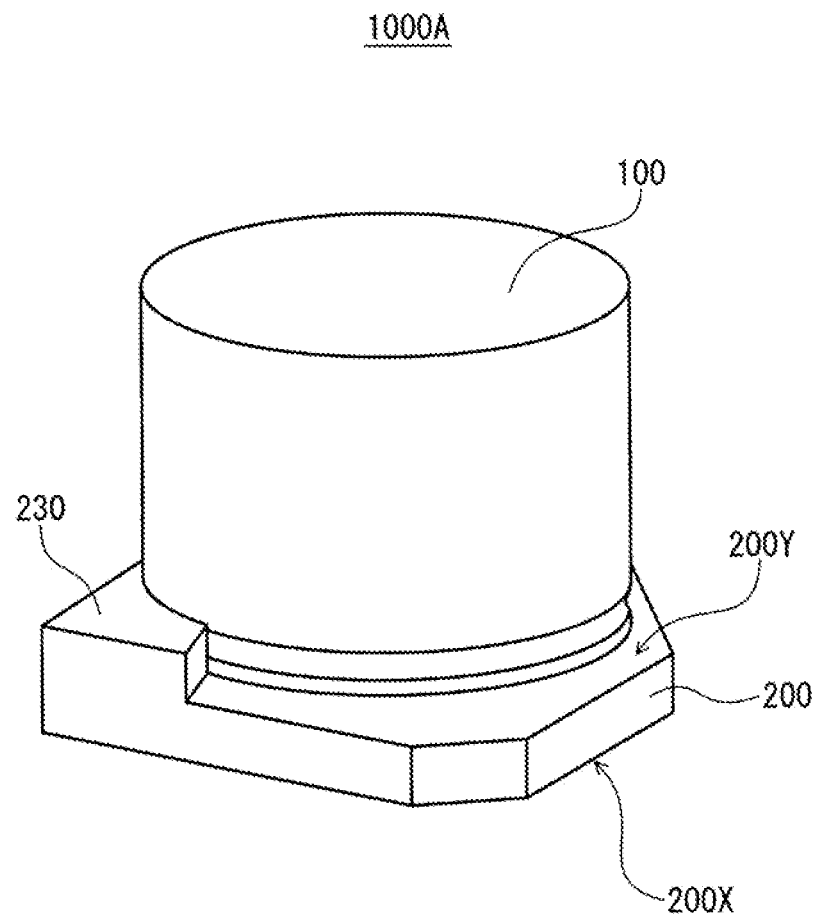
FIG. 1 is a perspective view schematically illustrating a capacitor with a seat plate according to an exemplary embodiment of the present disclosure.

When an alternating-current voltage is applied to a capacitor, an alternating-current charge/discharge current (ripple current) flows through the capacitor. Since a capacitor element constituting the capacitor has an internal resistance called equivalent series resistance (ESR), the capacitor element generates heat by the ripple current. Meanwhile, since the seat plate is usually made of resin, heat generated inside an electrolytic capacitor is hardly released. Due to this heat, the capacitor element is likely to deteriorate, and it may become difficult to be used for a long period of time.

The plurality of lead terminals electrically connected to the capacitor element are led out of the capacitor main body through the sealing member and the seat plate. The plurality of led out lead terminals are usually bent along the surface of the seat plate at the substrate side and bonded to a circuit or the like provided on the substrate. Thus, conventionally, heat of the capacitor element is released to the substrate or the like via the lead terminal. Meanwhile, the thickness of the lead terminal is limited, and it is difficult to sufficiently dissipate heat enough to be able to cope with a high ripple current.

The seat plate according to the present exemplary embodiment includes a heat dissipation member, and the heat dissipation member is exposed at a surface (first surface) on the substrate side. Thus, heat dissipation is promoted by the heat dissipation member in addition to the lead terminal, and the heat of the capacitor is quickly transferred to the substrate or the like via the heat dissipation member.

First Exemplary Embodiment

A capacitor with a seat plate according to the present exemplary embodiment includes a capacitor main body and a seat plate that holds the capacitor main body. The capacitor main body includes a capacitor element, a case having an opening for housing the capacitor element, a sealing member that closes the opening of the case, and a plurality of lead terminals each penetrating the sealing member and the seat plate.

The seat plate (first seat plate) according to the present exemplary embodiment has a first surface and a second surface opposite to the first surface. The first seat plate includes a heat dissipation member (first heat dissipation member). The first heat dissipation member is exposed at the first surface and the second surface. The capacitor element is disposed at a side close to the second surface of the first seat plate. The case housing the capacitor element is in contact with the region of the first heat dissipation member, which is exposed at the second surface. That is, the first heat dissipation member thermally connects the case and the substrate or the like on which the capacitor is mounted. Due to this, the heat of the capacitor is quickly transferred to the substrate or the like via the first heat dissipation member, and deterioration of the capacitor element due to the heat is suppressed.

(First Seat Plate)

The first seat plate has a flat plate shape having the first surface and the second surface. The shape of the first surface and the second surface as viewed from the normal direction may be, for example, rectangular or substantially rectangular. At least one corner of the rectangular or substantially rectangular first seat plate may be chamfered. This makes it easy to grasp the orientation when the capacitor main body is mounted on the seat plate, and to grasp the polarity of the lead terminal led out from the capacitor main body. The first seat plate is provided with a through hole through which the lead terminal is inserted.

A positioning part for positioning the capacitor main body may be provided on the second surface of the first seat plate opposing the capacitor main body. The first surface of the first seat plate opposing the substrate or the like may be provided with a groove for housing the lead terminal.

The material of the first seat plate is not particularly limited. The first seat plate includes a thermosetting resin or a thermoplastic resin, for example, an epoxy resin, a phenol resin, a silicone resin, a melamine resin, a urea resin, an alkyd resin, polyurethane, polyimide, unsaturated polyester, polyphenylene sulfide, and polyphthalamide. Among them, polyphenylene sulfide or polyphthalamide is preferable in terms of excellent heat resistance.

The thickness of the flat plate-like first seat plate is not particularly limited, and is appropriately set according to the size of the capacitor.

(First Heat Dissipation Member)

The first heat dissipation member is held by the seat plate. Being held by the seat plate means that the first heat dissipation member is embedded in the seat plate. Meanwhile, a part of the first heat dissipation member is exposed at the first surface and the second surface of the first seat plate. A part of the heat dissipation member that is exposed at the first surface is thermally connected to a part of the heat dissipation member that is exposed at the second surface.

The shape of the first heat dissipation member is not particularly limited. From the viewpoint of miniaturization, it is preferable that the heat dissipation member has a shape that cause the outer shape of the seat plate not excessively change. This make it possible to easily replace the conventionally used seat plate with the seat plate according to the present exemplary embodiment. The first heat dissipation member held by the flat plate-shaped first seat plate may have, for example, a flat plate shape.

The exposed shape of the heat dissipation member as viewed from the first surface side is not particularly limited. The first heat dissipation member only needs to be exposed even in a small area on the first surface. The first surface of the first seat plate is a mounting surface to the substrate or the like. The first heat dissipation member exposed at the first surface of the first seat plate is disposed, for example, so as to be in contact with the wiring pattern of the substrate. This can enhance the heat dissipation effect of the first heat dissipation member. Hence, the heat of the capacitor element is efficiently transferred to the substrate or the like by the first heat dissipation member and the lead terminal. Preferably, the first heat dissipation member and the wiring pattern of the substrate are bonded to each other with a conductive bonding material containing metal such as solder or a conductive adhesive. A member having high thermal conductivity such as a thermal conductive sheet is preferably interposed between the first heat dissipation member and the wiring pattern of the substrate.

In terms of easily and quickly releasing the heat received by the exposed part at the second surface to the exposed part at the first surface, the exposed shape of the first heat dissipation member viewed from the first surface side preferably corresponds to the exposed shape of the first heat dissipation member viewed from the second surface side. Due to this, the heat transfer path tends to be short.

In terms of efficiently releasing the heat received by the exposed part at the second surface to the exposed part at the first surface, it is preferable that the exposed area of the first heat dissipation member at the first surface is as wide as possible. Meanwhile, in order to prevent a short circuit, it is preferable that a part of the first heat dissipation member that is in contact with the case is exposed at the first surface so as not to come into contact with the anode lead terminal. On the other hand, the exposed part at the first surface is preferably in contact with the cathode lead terminal. Due to this, the heat of the capacitor, which is transferred via the lead terminal, can be quickly transferred to the heat dissipation member.

The exposed part at the first surface of the first heat dissipation member may have an area proportion of 5% or more, or 10% or more in the area of the first surface. Preferably, the first heat dissipation member is widely exposed at the first surface within a range not in contact with the anode lead terminal. From the viewpoint of preventing a short circuit, the exposed part at the first surface of the first heat dissipation member may have an area proportion of 70% or less, or 60% or less in the area of the first surface.

The exposed shape of the first heat dissipation member as viewed from the second surface side is not particularly limited as long as the first heat dissipation member can come into contact with the case. The first seat plate is disposed at a side close to the sealing member of the capacitor main body. As will be described later, when the end part at the opening side (opening end part) of the case covers the peripheral edge of the surface at the seat plate side of the sealing member, the exposed shape of the first heat dissipation member as viewed from the second surface side may be, for example, an annular shape corresponding to the opening end of the case or a shape corresponding to a part of the opening end of the case.

The material of the first heat dissipation member is not particularly limited as long as it has high thermal conductivity. The first heat dissipation member has a thermal conductivity of, for example, 100 W/m·K or more, preferably 200 W/m·K or more, and more preferably 300 W/m·K or more. In terms of further enhancing the heat dissipation, the thermal conductivity of the first heat dissipation member is preferably higher than the thermal conductivity of the lead terminal. When the first heat dissipation member is in contact with the cathode lead terminal, the thermal conductivity of the first heat dissipation member is preferably higher than the thermal conductivity of the cathode lead terminal.

Examples of the material having high thermal conductivity include metals such as aluminum, copper, iron, and stainless steel, and ceramics. Examples of the ceramics having high thermal conductivity include silicon carbide (SiC), aluminum nitride (AlN), silicon nitride (SiN), and aluminum oxide ($Al_2O_3$). Among them, Al is preferable from the viewpoint of easy molding.

The thickness of the first heat dissipation member only needs to be appropriately set according to the thickness of the first seat plate.

FIG. 1 is a perspective view schematically illustrating a capacitor with a seat plate according to the present exemplary embodiment.

Capacitor 1000A with a seat plate according to the present exemplary embodiment includes capacitor main body 100 and first seat plate 200 that holds capacitor main body 100. First seat plate 200 has first surface 200X and second surface 200Y opposite to first surface 200X. Capacitor main body 100 is disposed on second surface 200Y of first seat plate 200. First seat plate 200 has a substantially flat plate shape, but second surface 200Y is provided with positioning part 230 for positioning capacitor main body 100.

Figure 2A:
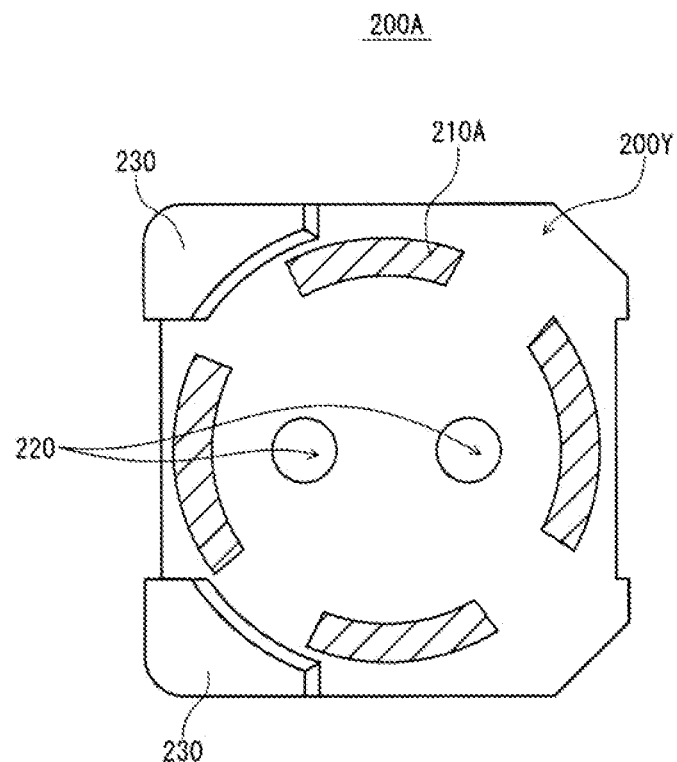
FIG. 2A is a plan view schematically illustrating an example of the seat plate as viewed from a second surface side according to the exemplary embodiment of the present disclosure.

FIG. 2A is a plan view schematically illustrating an example of a first seat plate as viewed from the second surface side according to the present exemplary embodiment.

The shape of second surface 200Y of first seat plate 200A viewed from the normal direction is substantially rectangular, and two corners are chamfered. First seat plate 200A is provided with two through holes 220 through which the lead terminals are inserted.

First seat plate 200A includes first heat dissipation member 210A. First heat dissipation member 210A is embedded in first seat plate 200A, but a part thereof is exposed from first surface 200X and second surface 200Y of first seat plate 200. First heat dissipation member 210A is obtained by processing a substantially flat metal plate into, for example, a wave shape. The exposed shape of first heat dissipation member 210A viewed from a side of second surface 200Y corresponds to a convex part of the wave-shaped metal plate and corresponds to a part of the opening end part of the case. Due to this, first heat dissipation member 210A can come into contact with the case.

Figure 2B:
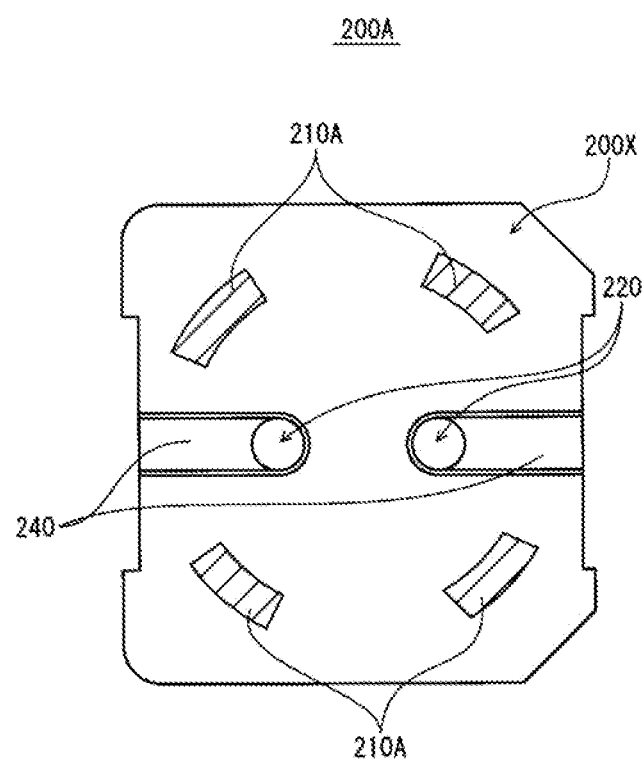
FIG. 2B is a plan view schematically illustrating an example of the seat plate of FIG. 2A as viewed from a first surface side.

FIG. 2B is a plan view schematically illustrating an example of the seat plate of FIG. 2A as viewed from the first surface side.

First surface 200X of first seat plate 200A is a mounting surface when the capacitor with a seat plate is mounted on a substrate or the like. First surface 200X has groove 240 for housing the lead terminal.

The exposed shape of first heat dissipation member 210A viewed from a side of first surface 200X corresponds to a concave part of the wave-shaped metal plate and corresponds to another part of the opening end part of the case. A part of first heat dissipation member 210A that is exposed at first surface 200X is bonded to the wiring pattern of the substrate by solder or the like.

Figure 3A:
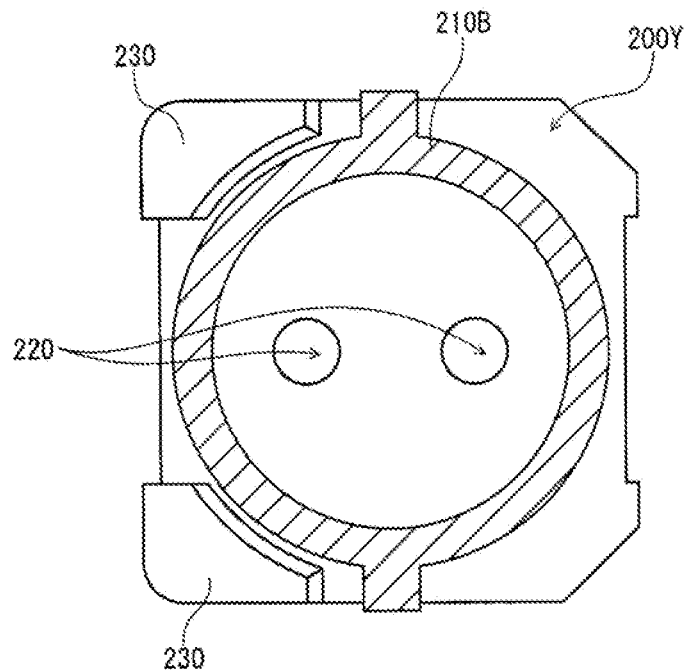
FIG. 3A is a plan view schematically illustrating an example of another seat plate as viewed from the second surface side according to the exemplary embodiment of the present disclosure.
Figure 3B:
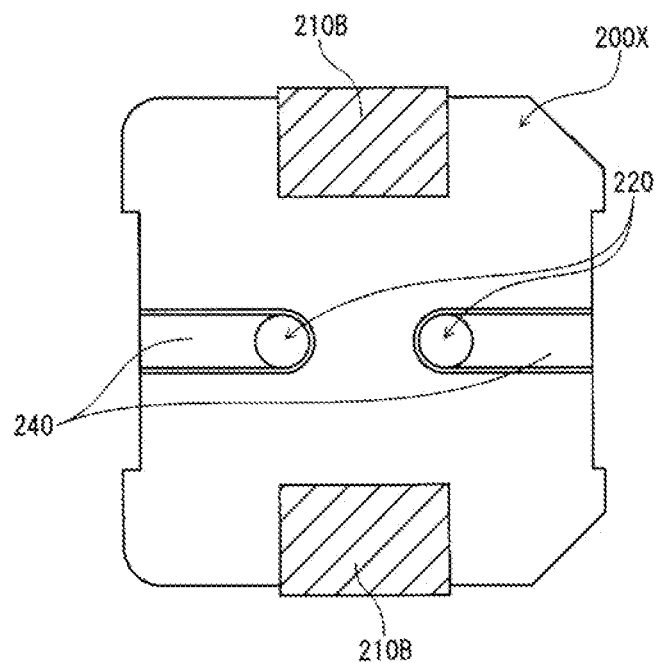
FIG. 3B is a plan view schematically illustrating an example of the seat plate of FIG. 3A as viewed from the first surface side.

FIG. 3A is a plan view schematically illustrating an example of another seat plate as viewed from the second surface side according to the present exemplary embodiment. FIG. 3B is a plan view schematically illustrating an example of the seat plate of FIG. 3A as viewed from the first surface side.

First seat plate 200B illustrated in FIGS. 3A and 3B has the same configuration as that of first seat plate 200A illustrated in FIGS. 2A and 2B except for the exposed shape at first surface 200X and second surface 200Y of first heat dissipation member 210B.

First heat dissipation member 210B is obtained by bending a substantially flat metal plate. For example, first heat dissipation member 210B is obtained by punching out, from a metal plate, a member having a shape including an annular body and two straps. The two straps respectively extend from two opposing positions of the annular body toward outside of the annular body. And then each of the two straps is bended to complete first heat dissipation member 210B. Note that the tips of the straps each spread in a substantially rectangular shape. Due to this, first heat dissipation member 210B is exposed in an annular shape substantially corresponding to the opening end part of the case on second surface 200Y, and is exposed in a substantially rectangular shape at two positions on first surface 200X. First heat dissipation member 210B covers about 20% of the area of first surface 200X. Meanwhile, first heat dissipation member 210B is exposed at first surface 200X so as not to overlap with both grooves 240 in which the anode lead terminal is housed.

Figure 4A:
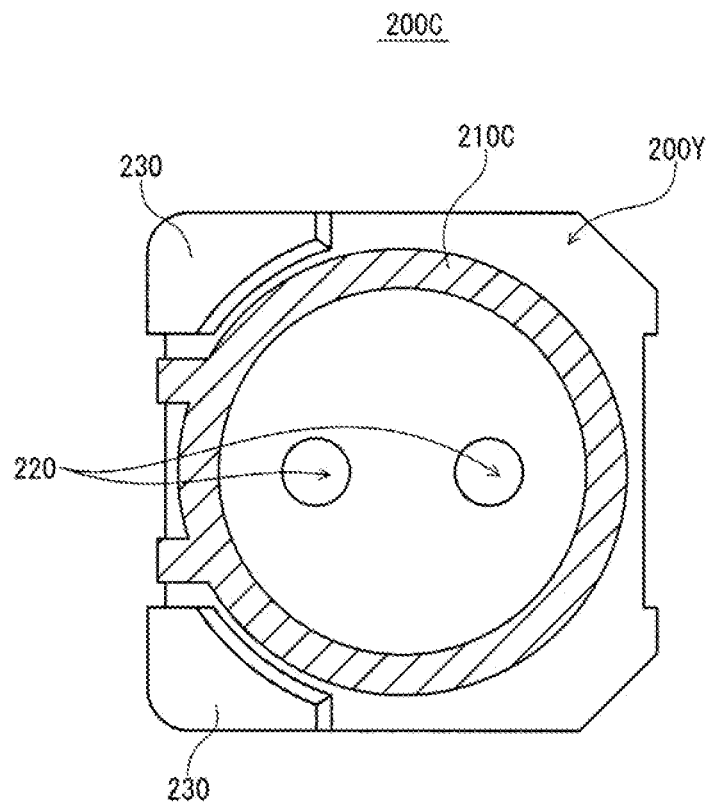
FIG. 4A is a plan view schematically illustrating an example of still another seat plate as viewed from the second surface side according to the exemplary embodiment of the present disclosure.
Figure 4B:
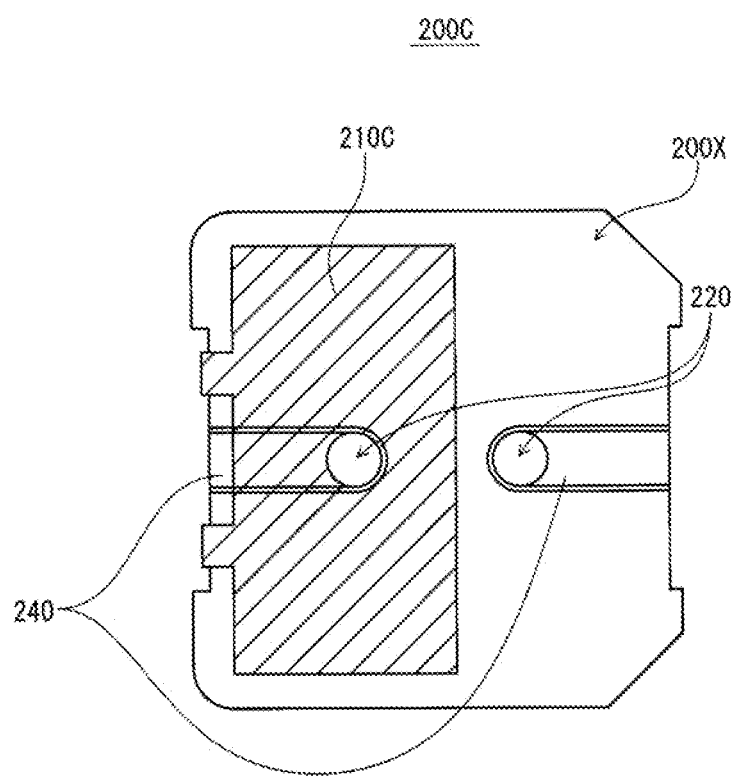
FIG. 4B is a plan view schematically illustrating an example of the seat plate of FIG. 4A as viewed from the first surface side.

FIG. 4A is a plan view schematically illustrating an example of still another seat plate as viewed from the second surface side according to the present exemplary embodiment. FIG. 4B is a plan view schematically illustrating an example of the seat plate of FIG. 4A as viewed from the first surface side.

First seat plate 200C illustrated in FIGS. 4A and 4B has the same configuration as that of first seat plate 200A illustrated in FIGS. 2A and 2B except for the exposed shape at first surface 200X and second surface 200Y of first heat dissipation member 210C.

First heat dissipation member 210C is also obtained by bending a substantially flat metal plate. For example, first heat dissipation member 210C is obtained by punching out, from a metal plate, a member having a shape including an annular body and two straps. The two straps extend from proximate positions of the annular body toward outside of the annular body. And then each of the two straps is bended to complete first heat dissipation member 210C. Note that the tips of the straps each spread in a substantially rectangular shape, and the two straps are coupled. Due to this, first heat dissipation member 210C is exposed in an annular shape substantially corresponding to the opening end part of the case on second surface 200Y, and is exposed in a substantially rectangular shape on first surface 200X. First heat dissipation member 210B covers about 45% of the area of first surface 200X.

Meanwhile, in order to prevent a short circuit, first heat dissipation member 210C is exposed at first surface 200X so as not to overlap one groove 240 in which the anode lead terminal is housed. On the other hand, first heat dissipation member 210C is exposed along another groove 240 in which the cathode lead terminal is housed. Due to this, first heat dissipation member 210 and the cathode lead terminal can come into contact with each other, and the heat dissipation efficiency of the capacitor is enhanced. First heat dissipation member 210 and the cathode lead terminal are more easily brought into contact with each other by a conductive bonding material used when the capacitor is mounted on the substrate.

Second Exemplary Embodiment

A capacitor with a seat plate according to the present exemplary embodiment includes a capacitor main body and a seat plate that holds the capacitor main body. The capacitor main body includes a capacitor element, a case having an opening for housing the capacitor element, a sealing member that closes the opening of the case, and a plurality of lead terminals each penetrating the sealing member and the seat plate.

The seat plate (second seat plate) according to the present exemplary embodiment includes a base part and a support wall that extends along a peripheral surface of the case from the base part. The base part has a first surface and a second surface opposite to the first surface. A part of the heat dissipation member (second heat dissipation member) is disposed in the support wall of the second seat plate. Another part of the second heat dissipation member is exposed at the first surface of the second seat plate. That is, the second heat dissipation member covers a larger area of the case. Further, the peripheral surface of the case is thermally connected to the substrate or the like on which the capacitor is mounted. Due to this, the heat of the capacitor is quickly transferred to the substrate or the like via the second heat dissipation member, and deterioration of the capacitor element due to the heat is suppressed.
(Second Seat Plate)

The second seat plate includes the base part having the first surface and the second surface, and the support wall extending along the peripheral surface of the case from the base part.

The base part has, for example, a flat plate shape. The base part may have a shape similar to that of the first seat plate. The base part is provided with a through hole through which the lead terminal is inserted.

The support wall extends along the peripheral surface of the case, for example, in a direction from the opening end part of the case toward the other end part. The capacitor main body is fitted to the support wall and fixed to the second seat plate.

The shape of the support wall is not particularly limited. The support wall may have a tubular shape covering the entire peripheral surface of the case, may have a tubular shape covering a part of the peripheral surface of the case, or may have a columnar shape covering a part of the peripheral surface of the case. A plurality of columnar support walls (hereinafter, they may be referred to as support columns) are preferably disposed. The plurality of support columns are preferably arranged point-symmetrically or substantially point-symmetrically with respect to the center of the second surface. Substantial point-symmetry means that the center of gravity of each support column exists at an angularly equivalent position with respect to the center of the second surface, for example. The central angle formed by the centers of gravity of adjacent support columns is preferably 360/n degrees when the number of support columns is n. The number of support columns only needs to be, for example, 2 to 10. Considering the balance between the stability of the capacitor main body and the ease of manufacturing the seat plate, the number of support columns is preferably 2, 3, or 4. The heights of the plurality of support columns may be the same or may be different.

The material of the second seat plate is not particularly limited, and may be the same as that of the first seat plate. The base part and the support wall may be separate bodies or may be integrally molded. The thickness of the flat plate-shaped base part is not particularly limited. The thickness of the base part may be, for example, 0.2 mm or more and 2.0 mm or less. The thickness of the support wall is also not particularly limited. The thickness of the support wall may be, for example, 0.2 mm or more and 4.0 mm or less.
(Heat Dissipation Member)

A part of the heat dissipation member (second heat dissipation member) included in the second seat plate is disposed in the support wall. Being disposed in the support wall means that the second heat dissipation member is included in the support wall and is not exposed from the support wall, or that a part of the second heat dissipation member is embedded in the support wall and another part is exposed from the support wall. Meanwhile, in either case, the other part of the second heat dissipation member is disposed in the base part. Further, the second heat dissipation member disposed in the support wall is thermally connected to the second heat dissipation member disposed in the base part. A part of the second heat dissipation member disposed in the base part is exposed at the first surface.

The shape of the second heat dissipation member is not particularly limited. From the viewpoint of miniaturization, it is preferable that the heat dissipation member has a shape that causes the outer shapes of the support wall and the base part not excessively change. This make it possible to easily replace the conventionally used seat plate with the seat plate according to the present exemplary embodiment. The second heat dissipation member disposed in the support wall has, for example, a curved surface along the peripheral surface of the case. The second heat dissipation member disposed in the base part may be integrated with or may be separated from the second heat dissipation member disposed in the support wall. When the second heat dissipation member is integrated body disposed in the support wall and in the base part, the second heat dissipation member disposed in the support wall may directly penetrate the base part. When the second heat dissipation members are separated bodies respectively disposed in the support wall and in the base part, the second heat dissipation member disposed in the base part may have a flat plate shape similarly to the base part.

A part of the second heat dissipation member is exposed at the first surface of the second seat plate.

The exposed shape of the second heat dissipation member as viewed from the first surface side is not particularly limited. The exposed shape of the second heat dissipation member as viewed from the first surface side may be similar to the projected shape of the second heat dissipation member disposed on the support wall onto the first surface. That is, the support wall and the base part may be penetrated by one second heat dissipation member. Due to this, the heat transfer path tends to be short.

In terms of efficiently releasing the heat received by the exposed part at the second surface to the exposed part at the first surface, it is preferable that the exposed area of the second heat dissipation member at the first surface is as wide as possible. Meanwhile, similarly to the first heat dissipation member, the second heat dissipation member is exposed at the first surface so as not to come into contact with the anode lead terminal. On the other hand, the exposed part at the first surface is preferably in contact with the cathode lead terminal. Such an exposed shape can be achieved by separating the second heat dissipation member disposed in the support wall and the second heat dissipation member disposed in the base part.

The exposed part at the first surface of the second heat dissipation member may have an area proportion of 5% or more, or 10% or more in the area of the first surface. Preferably, the second heat dissipation member is widely exposed at the first surface within a range not in contact with the anode lead terminal. From the viewpoint of preventing a short circuit, the exposed part at the first surface of the second heat dissipation member may have an area proportion of 70% or less, or 60% or less in the area of the first surface.

A part of the second heat dissipation member may be included in the support wall. In this case, the second heat dissipation member is not exposed from the support wall. A part of the second heat dissipation member may be embedded in the support wall, and another part may be exposed from the support wall. When the second heat dissipation member is exposed from the support wall at the case side, the second heat dissipation member can come into contact with the case, and the heat dissipation is more easily enhanced.

The material of the second heat dissipation member is not particularly limited, and may be the same as that of the first heat dissipation member. The thickness of the second heat dissipation member only needs to be appropriately set according to the thickness of the support wall and/or the base part.

Figure 5:
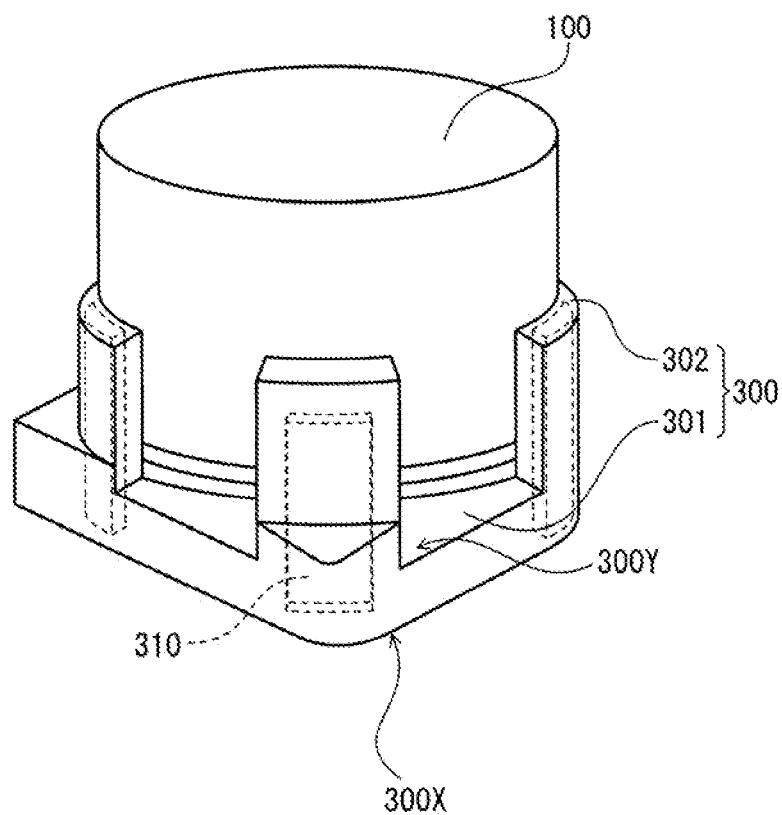
FIG. 5 is a perspective view schematically illustrating a capacitor with a seat plate according to another exemplary embodiment of the present disclosure.

FIG. 5 is a perspective view schematically illustrating the capacitor with the seat plate according to the present exemplary embodiment.

Capacitor 1000B with a seat plate according to the present exemplary embodiment includes capacitor main body 100 and second seat plate 300 that holds capacitor main body 100. Second seat plate 300 includes base part 301 having first surface 300X and second surface 300Y opposite to first surface 300X, and four columnar support walls 302 extending from base part 301 along the peripheral surface of the case. Capacitor main body 100 is disposed on second surface 300Y of second seat plate 300.

Four support walls 302 each include second heat dissipation member 310. Second heat dissipation member 310 is a metal plate and penetrates base part 301 and support wall 302. The metal plate preferably has a shape along the peripheral surface of the case, for example, a curved surface. A part of second heat dissipation member 310 is disposed in support wall 302 of second seat plate 300. Another part of second heat dissipation member 310 is disposed in base part 301.

Figure 6A:
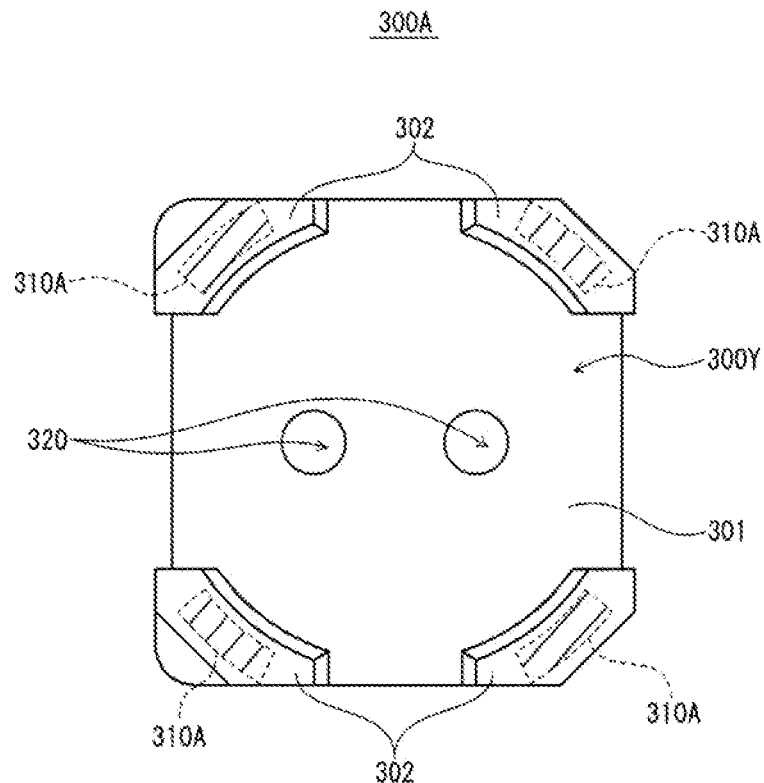
FIG. 6A is a plan view schematically illustrating an example of a seat plate as viewed from the second surface side according to another exemplary embodiment of the present disclosure.

FIG. 6A is a plan view schematically illustrating an example of the seat plate as viewed from the second surface side according to the present exemplary embodiment.

The shape of second surface 300Y of second seat plate 300A viewed from the normal direction is substantially rectangular, and two corners are chamfered. Second seat plate 300A is provided with two through holes 320 through which the lead terminals are inserted. Columnar support walls 302 are arranged at the four corners of second surface 300Y, and are arranged substantially point-symmetrically with respect to the center of second surface 300Y. Support walls 302 have the same height. Second heat dissipation member 310A is included in support wall 302 and is not exposed from support wall 302. When viewed from a side of second surface 300Y, second heat dissipation member 310A is not exposed.

Figure 6B:
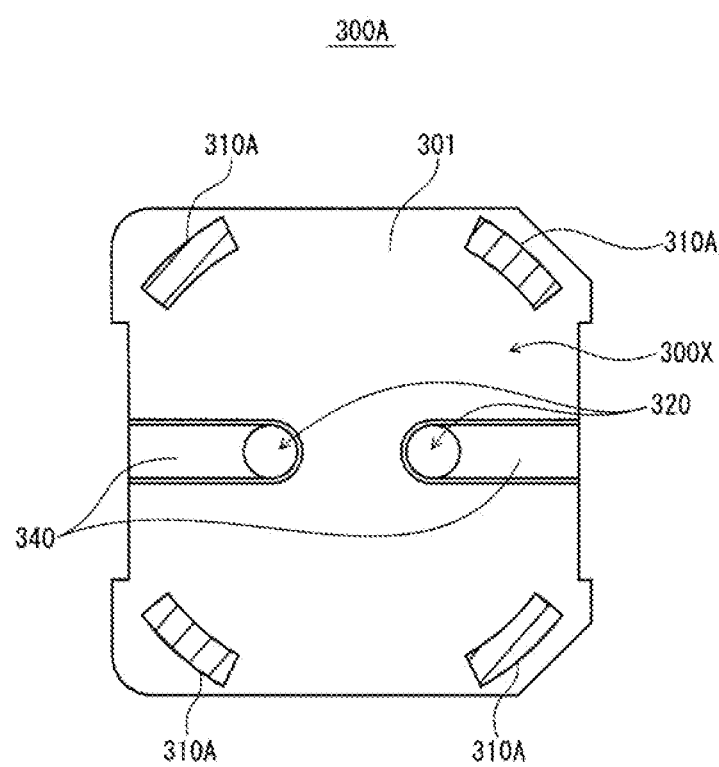
FIG. 6B is a plan view schematically illustrating an example of the seat plate of FIG. 6A as viewed from the first surface side.

FIG. 6B is a plan view schematically illustrating an example of the seat plate of FIG. 6A as viewed from the first surface side.

First surface 300X is a mounting surface when the capacitor with a seat plate is mounted on a substrate or the like. First surface 300X has two grooves 340 for housing the lead terminals.

The exposed shape of second heat dissipation member 310A as viewed from a side of first surface 300X is similar to the projected shape of second heat dissipation member 310A disposed on support wall 302 onto first surface 300X.

Figure 6C:
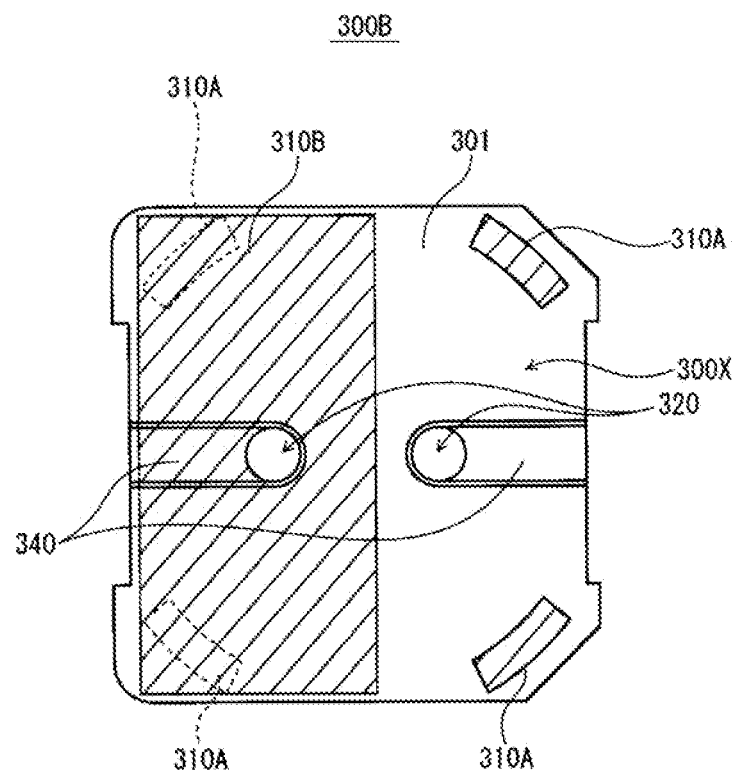
FIG. 6C is a plan view schematically illustrating another example of the seat plate of FIG. 6A as viewed from the first surface side.

FIG. 6C is a plan view schematically illustrating another example of the seat plate of FIG. 6A as viewed from the first surface side.

Second seat plate 300B illustrated in FIG. 6C has the similar configuration to that of second seat plate 300A illustrated in FIGS. 6A and 6B except that second heat dissipation member 310B having a flat plate shape and a substantially rectangular shape is also disposed on base part 301.

The exposed shape of second heat dissipation member 310B as viewed from a side of first surface 300X is a combination of a part of the projected shape of second heat dissipation member 310A disposed in support wall 302 onto first surface 300X and a substantially rectangular shape by second heat dissipation member 310B. Second heat dissipation member 310A covers about 45% of the area of first surface 300X.

Meanwhile, in order to prevent a short circuit, second heat dissipation member 310B is exposed on first surface 300X so as not to overlap one groove 340 in which the anode lead terminal is housed. On the other hand, second heat dissipation member 310B is exposed along another groove 340 in which the cathode lead terminal is housed. Due to this, second heat dissipation member 310B can come into contact with the cathode lead terminal, and the heat dissipation efficiency of the capacitor is enhanced. Second heat dissipation member 310B and the cathode lead terminal are more easily brought into contact with each other by a conductive bonding material used when the capacitor is mounted on the substrate.

Figure 7:
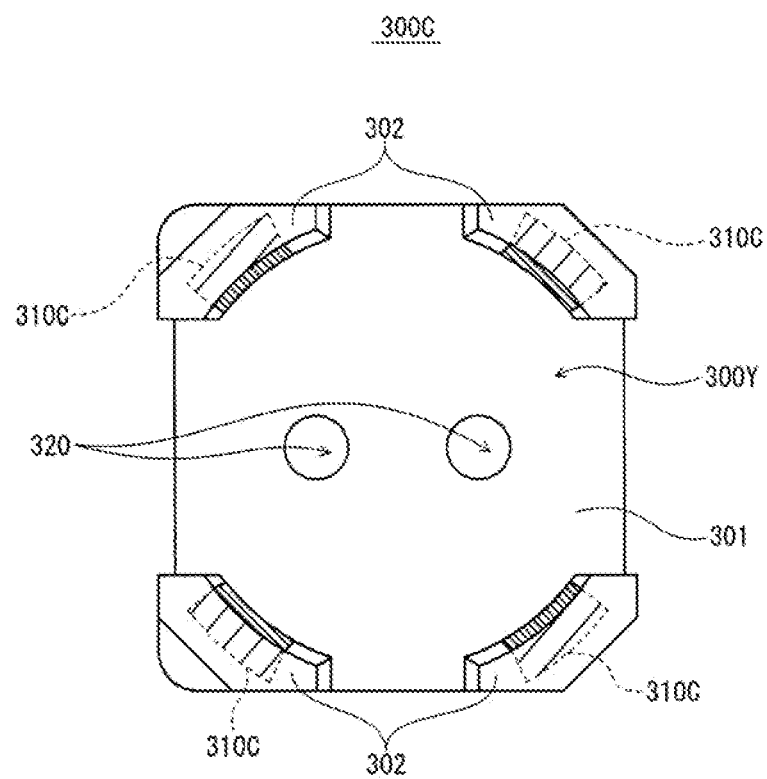
FIG. 7 is a plan view schematically illustrating an example of another seat plate as viewed from the second surface side according to another exemplary embodiment of the present disclosure.

FIG. 7 is a plan view schematically illustrating an example of another seat plate as viewed from the second surface side according to the present exemplary embodiment.

Second seat plate 300C illustrated in FIG. 7 has the similar configuration to that of the seat plate illustrated in FIGS. 6A and 6B except that second heat dissipation member 310C is exposed from the surface of support wall 302 at the case side.

A part of second heat dissipation member 310C is embedded in support wall 302, but a part thereof is exposed at the surface of support wall 302 at the case side. Thus, second heat dissipation member 310C can come into contact with the case, and the heat dissipation is further enhanced.

Hereinafter, other constituent members of the capacitor with a seat plate according to the present exemplary embodiment will be described.

(Capacitor Element)

The capacitor element includes, for example, an anode body having a dielectric layer, a cathode body, and a solid electrolyte disposed between the anode body and the cathode body. In the case of a wound capacitor element, a foil-shaped anode body and a foil-shaped cathode body are spirally wound.

(Anode Body)

The anode body is a metal foil containing at least one valve metal such as titanium, tantalum, aluminum, and niobium. The anode body may contain the valve metal in a form of an alloy containing the valve metal, a compound containing the valve metal, or the like. The thickness of the anode body is not particularly limited, and is, for example, 15 μm or more and 300 μm or less. The thickness is an average value at any five points (the same applies hereinafter). The surface of the anode body may be roughened by etching or the like.

A dielectric layer is formed on the surface of the anode body. The dielectric layer is formed, for example, by subjecting the anode body to an anodizing treatment. In this case, the dielectric layer can contain an oxide of the valve metal. The dielectric layer is not limited to this as long as it functions as a dielectric.

(Cathode Body)

The cathode body only needs to have a function as a cathode and is not particularly limited. The cathode body may be a metal foil. The type of metal is not particularly limited, and, similarly to the anode body, it may be a valve metal or an alloy containing a valve metal, or may be other than a valve metal such as iron (Fe) and copper (Cu). The thickness of the cathode body is not particularly limited, and is, for example, 15 μm or more and 300 μm or less. The surface of the cathode body may be roughened or subjected to an anodizing treatment as necessary. An inorganic layer containing carbon, nickel, titanium, and an oxide or nitride thereof may be formed on the surface of the cathode body.

(Separator)

A separator may be interposed between the anode body and the cathode body. When a solid electrolyte having a sufficient thickness is disposed between the anode body and the cathode body, the separator may be omitted.

The separator is not particularly limited as long as being porous. Examples of the separator include a nonwoven fabric made of cellulose fiber, a nonwoven fabric made of glass fiber, a microporous membrane made of polyolefin, a fabric cloth, and a nonwoven fabric. The thickness of the separator is not particularly limited, and is, for example, 10 μm or more and 300 μm or less.

(Solid Electrolyte)

The solid electrolyte contains, for example, a conductive polymer.

Examples of the conductive polymer include polypyrrole, polythiophene, polyfuran, polyaniline, polyacetylene, polyphenylene, polyphenylene vinylene, polyacene, and polythiophene vinylene. These may be used alone, may be used in combination of two or more types, or may be a copolymer of two or more types of monomers.

In the present description, polypyrrole, polythiophene, polyfuran, polyaniline, and the like mean polymers having, as a basic skeleton, polypyrrole, polythiophene, polyfuran, polyaniline, and the like, respectively. Thus, polypyrrole, polythiophene, polyfuran, polyaniline, and the like each can also include its derivative. For example, polythiophene contains poly(3,4-ethylenedioxythiophene) and the like.

The solid electrolyte may contain a dopant together with the conductive polymer. The dopant may be a monomolecular anion or may be a polymeric anion. Specific examples of the monomolecular anion include p-toluenesulfonic acid and naphthalenesulfonic acid. Specific examples of the polymeric anion include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These may be used alone or may be used in combination of two or more types. These may also be a polymer of a single monomer or may also be a copolymer of two or more types of monomers. Among them, a polymer anion derived from polystyrenesulfonic acid is preferable.

(Lead Terminal)

The anode lead terminal is connected to the anode body, and the cathode lead terminal is connected to the cathode body. The anode lead terminal and the cathode lead terminal penetrate the sealing member and the seat plate, and are led out of the capacitor main body. The led out lead terminal is, for example, bent along the first surface of the seat plate and housed in a groove provided on the first surface of the seat plate.

The material of the lead terminal is not particularly limited as long as it is electrochemically and chemically stable and has conductivity, and may be metal or non-metal. The shape of the lead terminal is also not limited in particular.

(Sealing Member)

The sealing member closes the opening of the case.

The sealing member may be an insulating substance. The insulating substance is preferably an elastic body. Use of the sealing member including an elastic body such as rubber can secure high sealing property. From the viewpoint of easily obtaining high heat resistance, silicone rubber, fluororubber, ethylene propylene rubber, chlorosulfonated polyethylene rubber (Hypalon™ rubber and the like), butyl rubber, isoprene rubber, and the like are preferable.

(Case)

The case has an opening for housing the capacitor element. The case includes, for example, a cylindrical part and a bottom wall that closes one end part of the cylindrical part. The other end part (opening end part) of the cylindrical part is closed by the sealing member and disposed at the seat plate side. The outer shape of the case is, for example, a columnar shape or a substantially columnar shape.

The opening end part of the cylindrical part covers, for example, the peripheral edge part of the surface of the sealing member at the seat plate side. Such an opening end part is formed by swaging the opening end part and the sealing member. The part of the heat dissipation member exposed at the second surface comes into contact with the opening end part covering the peripheral edge part of the surface at the seat plate side of the sealing member, for example. Furthermore, the opening end part side of the cylindrical part may be provided with an annular concave portion recessed so as to reduce the inner diameter of the cylindrical part. The annular concave part is formed by drawing the cylindrical part for fixing the sealing member to the case.

The material of the case is not particularly limited, and examples thereof include metals such as aluminum, an aluminum alloy, stainless steel, copper, iron, and brass. A surface layer (e.g., an oxide layer, a resin layer, or the like) having a desired function may be formed on the outer surface of the case.

Figure 8:
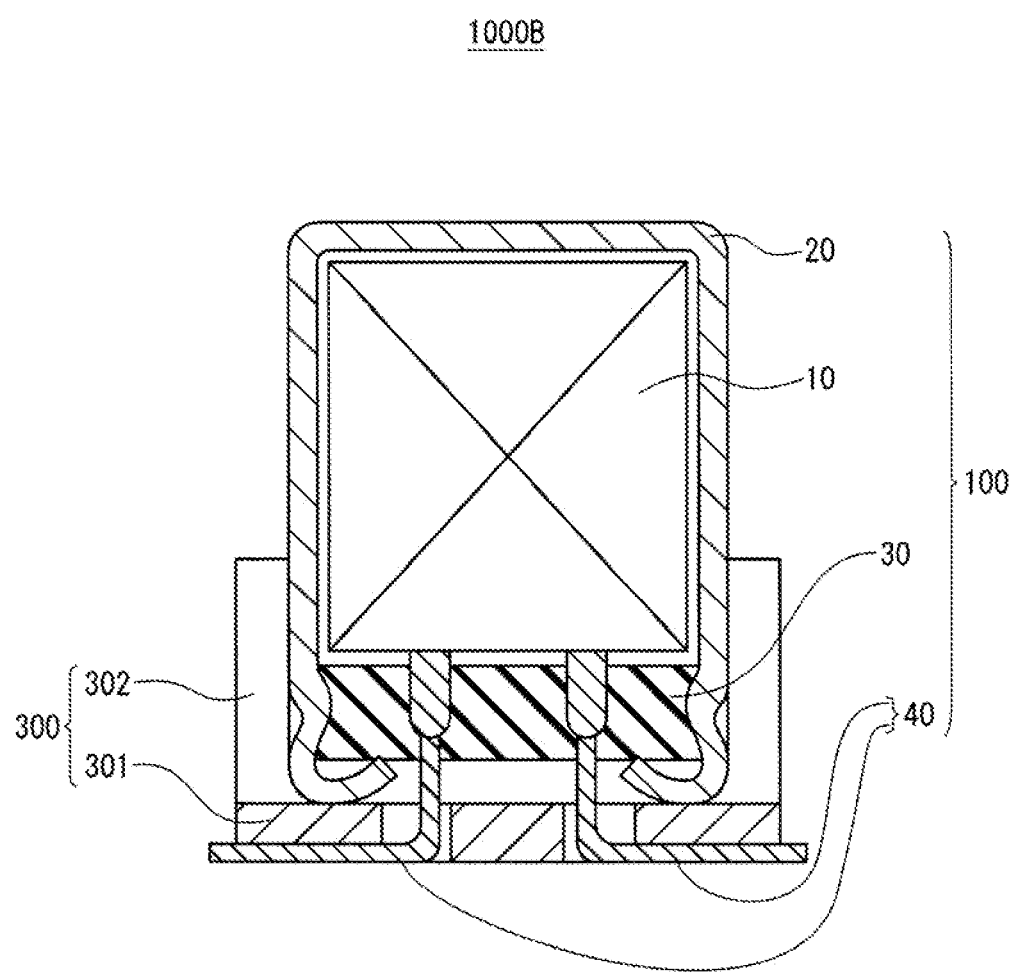
FIG. 8 is a sectional view schematically illustrating a capacitor with a seat plate, which is cut in a plane parallel to a longitudinal direction, according to an exemplary embodiment of the present disclosure.

FIG. 8 is a sectional view schematically illustrating the capacitor with the seat plate, which is cut in a plane parallel to a longitudinal direction, according to the present exemplary embodiment. FIG. 8 illustrates a capacitor including the second seat plate having a support wall.

Capacitor 1000B with a seat plate includes capacitor main body 100 and seat plate (second seat plate 300) that holds capacitor main body 100. Capacitor main body 100 includes capacitor element 10, case 20 including an opening for housing capacitor element 10, sealing member 30 for closing the opening of case 20, and two lead terminals 40 each penetrating sealing member 30 and second seat plate 300 and led out of capacitor main body 100. Second seat plate 300 has base part 301 and support wall 302 extending along the peripheral surface of case 20 from base part 301. A heat dissipation member (not illustrated) is disposed on base part 301 and support wall 302.

Since the present invention is excellent in heat dissipation, the present invention is particularly suitable for an electrolytic capacitor in which a high ripple current flows.

What is claimed is:

1. A capacitor with a seat plate, the capacitor comprising:
   a capacitor main body; and
   the seat plate that holds the capacitor main body, wherein:
   the capacitor main body includes:
   a capacitor element,
   a case having an opening for housing the capacitor element,
   a sealing member that closes the opening of the case, and
   a plurality of lead terminals each penetrating the sealing member and the seat plate,
   the seat plate includes a heat dissipation member, the seat plate including a base part and a support wall that extends from the base part along a peripheral surface of the case, the base part having a first surface and a second surface opposite to the first surface,
   the capacitor element is disposed at a side close to the second surface of the seat plate,
   a part of the heat dissipation member is disposed in the support wall and is in contact with the case, and
   the heat dissipation member is exposed at the first surface of the base part.

2. The capacitor with a seat plate according to claim 1, wherein:
   the plurality of lead terminals include a cathode lead terminal, and
   the cathode lead terminal is in contact with the heat dissipation member.

3. The capacitor with a seat plate according to claim 2, wherein a thermal conductivity of the heat dissipation member is higher than a thermal conductivity of the cathode lead terminal.

4. The capacitor with a seat plate according to claim 1, wherein the capacitor element includes:
   an anode body including a dielectric layer,
   a cathode body, and
   a solid electrolyte disposed between the anode body and the cathode body.

5. The capacitor with a seat plate according to claim 1, wherein the capacitor element further includes an electrolytic solution.

6. A capacitor with a seat plate, the capacitor comprising:
   a capacitor main body; and
   the seat plate that holds the capacitor main body, wherein:
   the capacitor main body includes:
   a capacitor element,
   a case having an opening for housing the capacitor element,
   a sealing member that closes the opening of the case, and
   a plurality of lead terminals each penetrating the sealing member and the seat plate,
   the seat plate includes a heat dissipation member, the seat plate having a first surface and a second surface opposite to the first surface,
   the heat dissipation member is exposed at the first surface and the second surface,
   the capacitor element is disposed at a side close to the second surface of the seat plate,
   the case is in contact with a region of the heat dissipation member, the region of the heat dissipation member being exposed at the second surface,
   the plurality of lead terminals include a cathode lead terminal, and
   the cathode lead terminal is in contact with the heat dissipation member.

7. The capacitor with a seat plate according to claim 6, wherein a thermal conductivity of the heat dissipation member is higher than a thermal conductivity of the cathode lead terminal.

8. The capacitor with a seat plate according to claim 6, wherein the capacitor element includes:
   an anode body including a dielectric layer,
   a cathode body, and
   a solid electrolyte disposed between the anode body and the cathode body.

9. The capacitor with a seat plate according to claim 6, wherein the capacitor element further includes an electrolytic solution.

* * * * *